US012614408B2

(12) United States Patent
Benitez et al.

(10) Patent No.: US 12,614,408 B2
(45) Date of Patent: Apr. 28, 2026

(54) FINGER RECOGNITION FRAMEWORK

(71) Applicant: Lenovo (Singapore) Pte. Ltd.,
Singapore (SG)

(72) Inventors: Himmler Eduardo Benitez, Ciudad
Obregon (MX); **Rinawl Ronald
Sequeira, Toronto (CA); Tabor Scott**,
Waldorf, MD (US); **Michael Andrew
Chupa, Easton, PA (US); Eric R Kern**,
Chapel Hill, NC (US)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 0 days.

(21) Appl. No.: 18/400,692

(22) Filed: Dec. 29, 2023

(65) Prior Publication Data
US 2025/0218213 A1    Jul. 3, 2025

(51) Int. Cl.
*G06V 40/12*    (2022.01)
*G06V 40/13*    (2022.01)
(52) U.S. Cl.
CPC ...... *G06V 40/1365* (2022.01); *G06V 40/1306*
(2022.01)
(58) Field of Classification Search
CPC ....................... G06V 40/1365; G06V 40/1306
See application file for complete search history.

(56) References Cited

U.S. PATENT DOCUMENTS

| | | | | |
|---|---|---|---|---|
| 2013/0287271 A1* | 10/2013 | Harper | ................. | G06V 10/771 |
| | | | | 382/124 |
| 2015/0043792 A1* | 2/2015 | Nada | .................. | G06V 40/1306 |
| | | | | 382/126 |
| 2016/0034738 A1* | 2/2016 | Luo | ..................... | G06V 40/1376 |
| | | | | 382/125 |
| 2016/0063471 A1* | 3/2016 | Kobres | ............ | G06Q 20/40145 |
| | | | | 705/18 |
| 2016/0110098 A1* | 4/2016 | Stewart | ............... | G06F 3/04886 |
| | | | | 345/173 |
| 2017/0063851 A1* | 3/2017 | Kim | ..................... | H04W 12/065 |
| 2018/0012054 A1* | 1/2018 | Apostolos | ............ | G06V 10/803 |
| 2018/0130370 A1* | 5/2018 | Szent-Miklosy | ........ | G09B 5/06 |
| 2018/0211094 A1* | 7/2018 | Shadd | ..................... | G06V 40/12 |
| 2018/0278606 A1* | 9/2018 | Adams, Jr. | .......... | H04L 63/0861 |
| 2018/0347952 A1* | 12/2018 | Hong | ................. | G06V 40/1306 |
| 2019/0050618 A1* | 2/2019 | Khuri-Yakub | ..... | A61B 5/02438 |
| 2019/0251379 A1* | 8/2019 | Bawolek | ............... | H04L 9/3231 |
| 2020/0401828 A1* | 12/2020 | Wang | ...................... | G06F 21/30 |
| 2024/0168627 A1* | 5/2024 | Lee | ..................... | G06F 3/04886 |

FOREIGN PATENT DOCUMENTS

CN             110472392 A   * 11/2019

* cited by examiner

*Primary Examiner* — Ibrahim A Khan
(74) *Attorney, Agent, or Firm* — Brian J. Pangrle

(57)        ABSTRACT
A method can include acquiring sensor data via a sensor for
a fingertip in contact with a surface; identifying a finger of
the fingertip based on the sensor data and stored data, where
the identifying identifies the finger as one of at least two
different fingers of a hand; pairing the identified finger with
the surface to determine a finger and surface pair; comparing
the finger and surface pair to a reference pair; and, based on
the comparing, issuing a signal.

14 Claims, 12 Drawing Sheets

Method 310

| Detect Finger and Key Pairs 314 | → | Compare to Reference 318 | → | Issue Notification(s) 322 |

LH4-A  RH4-;          LH4-A  RH4-;
LH3-S  RH3-L          LH3-S  RH3-L                    OK
LH2-D  RH2-K          LH2-D  RH2-K              (e.g., score)
LH1-E  RH1-J          LH1-E  RH1-J E.g., Password          E.g., Password
                                                   Match

400

Figure 6:
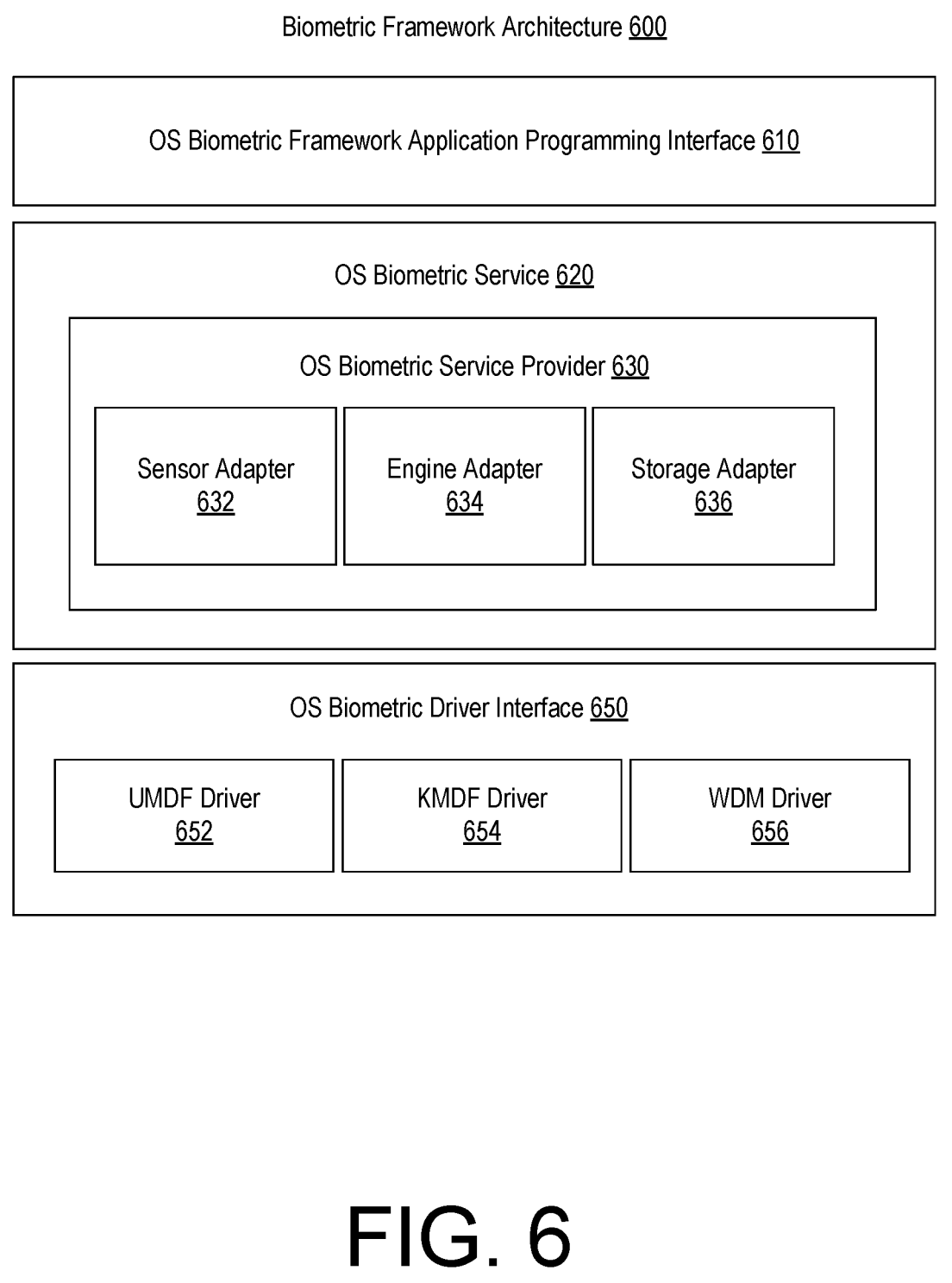

Biometric Framework Architecture 600

OS Biometric Framework Application Programming Interface 610

OS Biometric Service 620

OS Biometric Service Provider 630

| Sensor Adapter 632 | Engine Adapter 634 | Storage Adapter 636 |

OS Biometric Driver Interface 650

| UMDF Driver 652 | KMDF Driver 654 | WDM Driver 656 |

LH1      Contact Area

900

960

FINGER RECOGNITION FRAMEWORK

TECHNICAL FIELD

Subject matter disclosed herein generally relates to finger recognition technology for computing or other devices.

BACKGROUND

Various devices are operable according to one or more configurations, standards, protocols, etc., involving one or more fingers of a left hand and/or one or more fingers of a right hand. For example, consider an example of touch-typing that involves placing four fingers of the left hand and four fingers of the right hand in a horizontal row along keys of a middle region of a keyboard (e.g., a home row) to have each of these fingers also ready to reach for specific other keys of the keyboard. Touch-typing can be a learned skill where, for example, a touch typist will know finger location on a keyboard through muscle memory. Another type of typist may be referred to as a hybrid typist where, for example, a hybrid typist may type on a keyboard without looking at the keyboard but without strict adherence to the home row standard. As an example, a finger recognition framework may facilitate learning of, adherence to, development of, etc., desirable finger usage.

SUMMARY

A method can include acquiring sensor data via a sensor for a fingertip in contact with a surface; identifying a finger of the fingertip based on the sensor data and stored data, where the identifying identifies the finger as one of at least two different fingers of a hand; pairing the identified finger with the surface to determine a finger and surface pair; comparing the finger and surface pair to a reference pair; and, based on the comparing, issuing a signal. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 6 is a diagram of an example of a biometric framework architecture;

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
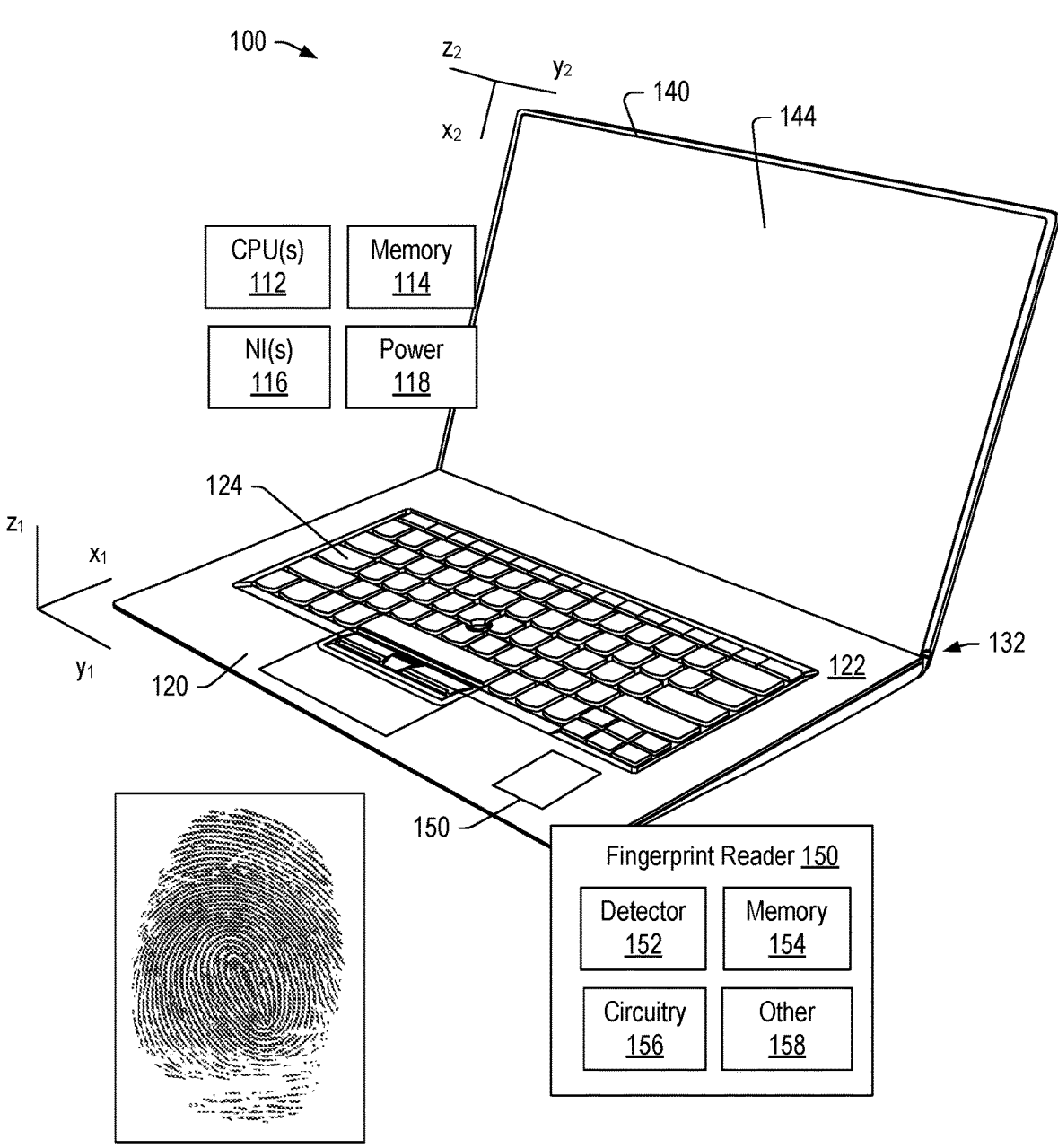
FIG. 1 is a diagram of an example of a device and an example of a fingerprint reader that may be part of the device.

FIG. 1 shows an example of a device 100 that includes a keyboard housing 120 and a display housing 140 that are pivotable with respect to each other via movement about one or more hinges 132 (e.g., one or more hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

In the example of FIG. 1, the one or more hinges 132 pivotably connect the keyboard housing 120 and the display housing 140 for orienting the display housing 140 with respect to the keyboard housing 120. For example, orientations may include orientations definable with respect to an axis (e.g., or axes).

As an example, the keyboard housing 120 can include a frontal surface 122 that may include a fingerprint reader 150. As shown, the fingerprint reader 150 can include a detector 152, memory 154, circuitry 156 and one or more other components 158. The fingerprint reader 150 can be provided as a unit that can be integrated into the device 100 such that the fingerprint reader 150 is operatively coupled to the device 100, for example, via a biometric framework. Such a framework may allow for interactions between the fingerprint reader 150 and one or more levels of one or more environments (e.g., an operating system environment, a BIOS environment, a pre-BIOS environment, etc.). As an example, an environment may be established via execution of instructions by one or more processors where the instructions may be stored in memory (e.g., boot memory, etc.).

As an example, a fingerprint reader may include circuitry that can capture a digital image of a fingerprint, which may be, for example, referred to as a "live" scan. A scan can be a dataset that can be digitally processed to create a biometric template (e.g., a collection of extracted features) which may be referred to as a base case. As an example, a biometric template or base case may be stored and accessible for purposes of matching (e.g., to authenticate a live scan, etc.). A stored biometric template, base case, or information derived therefrom and stored in memory prior to a live scan can be referred to as historical fingerprint data. As an example, a fingerprint reader can generate fingerprint data representative of a fingerprint of a finger where such data may be referred to as live scan data. As an example, a fingerprint reader and/or a biometric framework can include circuitry that authenticates a fingerprint via an authentication process and that identifies a change of the fingerprint based at least in part on the generated fingerprint data (e.g., live scan data) and historical fingerprint data (e.g., stored data from or based at least in part on one or more prior scans, etc.).

A fingerprint reader may utilize one or more types of circuitry. For example, consider a fingerprint reader that utilizes one or more of optical, capacitive, RF, thermal, piezoresistive, ultrasonic, piezoelectric, and MEMS circuitry.

As an example, a fingerprint reader can include one or more features of the NEXT Biometrics NB-1010-U and/or NB-2020-U fingerprint readers, which implement thermal technology. As an example, a fingerprint reader can include one or more features of the EgisTec ET300 fingerprint reader. As an example, a fingerprint reader can include one or more features of the Fingerprint Cards FPC 1025 fingerprint reader. As an example, a fingerprint reader can include one or more features of the Qualcomm Snapdragon Sense™ ID 3D fingerprint reader, which implements ultrasonic technology and a biometric integrated circuit that provides for data security. Ultrasonic technology (e.g., piezoelectric transducers, piezoelectric materials, etc.) can allow for scanning through an OLED display (e.g., approximately 1200 μm thick), scanning through aluminum (e.g., approximately 650 μm thick), and scanning through glass (e.g., approximately 800 μm thick).

As an example, one or more types of fingerprint readers can include one or more types of interfaces that provide for power and/or communication of information (e.g., via one or more busses). For example, consider a fingerprint reader as a unit that can be operatively coupled to circuitry of a device such as a computing device in a manner that the unit receives power and can transmit and/or receive information.

As an example, a fingerprint reader may include an active area (e.g., a window) of approximately 1600 $mm^2$ or less. For example, consider an active area of approximately 12 mm×12 mm (e.g., 144 $mm^2$) with a resolution of approximately 18000 pixels for a pixel density of approximately 500 ppi. Such a fingerprint reader may utilize one or more technologies. As an example, a capacitive touch technology may image a fingerprint from subepidermal layer(s) of a finger.

As an example, where a fingerprint reader is embedded in or otherwise at least in part integrated into a key of a keyboard (see, e.g., FIG. 2), the fingerprint reader (e.g., sensor portion) may be approximately the same area as a touch surface of a key or may be less than the area of a touch surface of a key. According to the ANSI standard (e.g., ANSI-INCITS 154-1988), alphanumeric keyboards may include keys that are on three-quarter inch centers (0.75 inches or 19 mm); noting that a touch surface of a key may be less than approximately 0.75 inches or 19 mm in one or more dimensions (see, e.g., $x_1$ and $y_1$ coordinates in FIG. 1). Such keys may be depressible keys that, according to the ANSI standard, may have a key travel distance of at least 0.15 inches (3.8 mm); noting that some keyboards for computing devices may include keys with lesser travel distance (e.g., or no key travel distance, for example, as for a touch sensor key).

As an example, one or more technologies of a fingerprint reader may provide for acquiring information as to sweat pores (e.g., sweat ducts) of a finger. As an example, a method can include analyzing sweat pore characteristics, for example, as part of an authentication process. As an example, sweat pore information may be utilized for one or more purposes (e.g., analyzing variability of scans, analyzing physiologic condition(s), etc.).

As an example, one or more matching algorithms may be utilized as part of an analysis that includes comparing previously stored data to acquired data (e.g., live scan data) for authentication purposes. Such an approach may include comparing an original image directly to a candidate image or, for example, comparing certain features of an original image (e.g., base case data) to certain features of a candidate image (e.g., candidate data).

As an example, a method can include one or more types of pre-processing that may aim to enhance quality of an image (e.g., data), for example, by filtering and/or removing unnecessary noise. As an example, minutiae extraction may be carried out by applying a ridge thinning algorithm that can remove redundant pixels of ridges. In such an example, thinned ridges of a fingerprint image may be marked with a unique ID to facilitate further operation. After minutiae extraction, a method may include, for example, false minutiae removal (e.g., due to a lack of amount of ink and cross link among ridges that may lead to inaccuracy in a fingerprint recognition process). As mentioned, sweat pore information may be analyzed as a characteristic of a finger (e.g., a fingerprint characteristic).

As an example, a method can include utilizing one or more pattern-based (or image-based) algorithms. For example, one or more pattern based algorithms may be implemented to compare particular fingerprint patterns (e.g., arch, whorl, and loop) between a previously stored template (e.g., base case) and a candidate fingerprint (e.g., live scan data). Such an approach can include aligning data (e.g., image data, etc.). For example, a method may include finding a central point in a fingerprint image and centering on that point (e.g., as a fiducial point). As an example, in a pattern-based approach, a template can include type, size, and orientation of patterns within an aligned fingerprint image (e.g., image data). As an example, a candidate fingerprint image may be graphically compared with a template image to determine a degree to which they match.

Various computing devices may rely on a fingerprint of a single finger for as a biometric for purposes of authorization as may be involved in a security protocol. For example, consider a fingerprint reader that is configured to read a fingerprint of an individual to authenticate (e.g., match a biometric template of the fingerprint of the individual). As an example, a fingerprint of a single finger of a particular hand of an individual may be utilized to as a password that, when the fingerprint is authenticated, allows the individual to utilize one or more features of a device (e.g., to logon to a computing device, etc.).

As to different fingers of a hand of an individual, each of these fingers will have a different fingerprint. In general, there may be some similarities between the index finger, the middle finger and the ring finger. For example, two or more of these three fingers may include one or more related patterns, which may be referred to as pattern-blocks. In such an example, the one or more related patterns may be a consequence of genetics. As to fingerprints of fingers of one hand of an individual compared to fingerprints of fingers of the other hand of the individual, that may differ. For example, they may have completely different fingerprint patterns such as a right hand with each finger having a distinct and similar loop pattern and a left hand with each finger having a distinct whorl pattern.

As an example, a finger recognition framework may provide for associating one or more regions of a device with one or more fingers of a hand or hands. For example, in touch-typing, consider a finger recognition framework that can receive signals from key-based detectors to identify each finger touching each key to thereby associate fingers and keys. In such an example, if an individual aims to be a touch-typist, the finger recognition framework can provide feedback that may help to guide the individual as to proper touch-typing according to a touch-typing standard (e.g., consider a home row standard).

While a touch-typing standard is mentioned, consider, as another example, a security protocol that involves touching one or more keys of a keyboard with a particular finger or particular fingers. For example, consider a passcode that involves touching the "Y" key with the middle finger of the right hand followed by touching the "E" key with the index finger of the left hand. In such an example, a finger recognition framework may receive signals and determine whether the passcode is met or not, for example, to authenticate use of one or more features of a computing device and/or one or more other devices.

While various keyboard-related (e.g., or key-pad related) examples are mentioned, consider a power tool that may have a trigger where the trigger is to be operated using a particular finger of a particular hand. In such an example, a finger recognition framework may receive signals from a fingerprint detector of the trigger to determine if the particular finger on the trigger is the correct finger (e.g., or within a group of acceptable fingers). In such an example, the finger recognition framework may block usage (e.g., disable) of the power tool if the finger is not the correct finger (e.g., or within a group of acceptable fingers) and may allow usage (e.g., enable) of the power tool if the finger is the correct finger (e.g., or within a group of acceptable fingers). As an example, a power tool that includes and/or is operatively coupled to a finger recognition framework may improve safety, security, etc., of the power tool.

While a power tool is mentioned as an example, as another example, consider a weapon such as, for example, a gun. In such an example, a trigger of the weapon may include a detector as explained with respect to a trigger of a power tool. In such an example, the finger recognition framework may block usage (e.g., disable) of the weapon if the finger is not the correct finger (e.g., or within a group of acceptable fingers) and may allow usage (e.g., enable) of the weapon if the finger is the correct finger (e.g., or within a group of acceptable fingers). As an example, a weapon that includes and/or is operatively coupled to a finger recognition framework may improve safety, security, etc., of the weapon.

While various examples pertain to finger recognition as to associating a portion of a device to a finger or portions of a device to fingers, a finger recognition framework may also operate as a biometric identification framework. For example, such a framework may provide for implementation of one or more security measures that involve identifying an individual or individuals before enabling use, disabling use, etc. For example, a finger recognition framework may operate using a whitelist and a blacklist of individuals, which may be further defined according to one or more finger-related aspects. In such an example, Joe may be limited to using his left index finger on a trigger of a device while Sam may be limited to using his right index finger on the trigger of the device. In such an example, a finger recognition framework may be able to identify that Joe is holding the device but that Joe does not have the appropriate finger on the trigger of the device. As to feedback, the finger recognition framework may call for issuance of a notification (e.g., visual, haptic, audio, etc.) to instruct Joe to use the appropriate finger. In such an example, the notification may provide for identifying Joe by name: "Joe, please take your right index finger off the trigger and place your left index finger on the trigger". As in the example involving the two individuals Joe and Sam, a finger recognition framework may provide for handling of multiple individuals as users of a device or devices.

While various examples refer to computing devices, power tools and weapons, a finger recognition framework may find use with one or more other types of devices. For example, consider a vehicle where an individual may place a finger or fingers on a steering wheel, a button, a shifter, etc. In such an example, the vehicle may include and/or be operatively coupled to a finger recognition framework that can take and/or call for one or more actions responsive to finger recognition.

In various instances, devices such as firearms, computers, and cars do not automatically adjust to an individual without some manual intervention. As an example, a finger recognition framework may provide for detection of an individual and one or more appendages of the individual to adjust one or more profiles, ergonomics and access levels for the individual.

As an example, a finger recognition framework may provide for control of one or more types of devices (e.g., firearms, computers, power tools, vehicles, etc.) through one or more types of detection, which may include one or more of detection of an individual, detection of a location, and detection of finger placement.

As an example, a finger recognition framework may provide for one or more of identification, location, personalization, and training. As to identification, consider, as an example, use of one or more fingerprints to identify an individual using one or more devices and, based on the identified individual, allowing for access to one or more features of the one or more devices, etc. As to location, consider as an example, identification of a location matched with an individual to determine one or more levels of access, for example, consider an individual may be allowed to fire a firearm at a public range but not in a shopping mall. As to personalization, consider, as an example, based on detection of individual, adjusting a device to meet one or more specific preferences. In such an example, the device may be a vehicle that, when a person puts her fingers on the steering wheel, the seat adjusts automatically to her position and the radio presets automatically go to personalized presets. As another example, when an individual in law enforcement is detected on his firearm, he may be allowed to shoot his weapon while in pursuit or in self-defense in the field, while that weapon is disabled while the individual is in the police precinct. As to training, consider, as an example, improvement of firearm training by detecting which finger is where on the firearm for replay and correction for proper handling. As another example, consider detection of fingers on keyboard to determine proper touch-typist keyboard locations.

Figure 2:
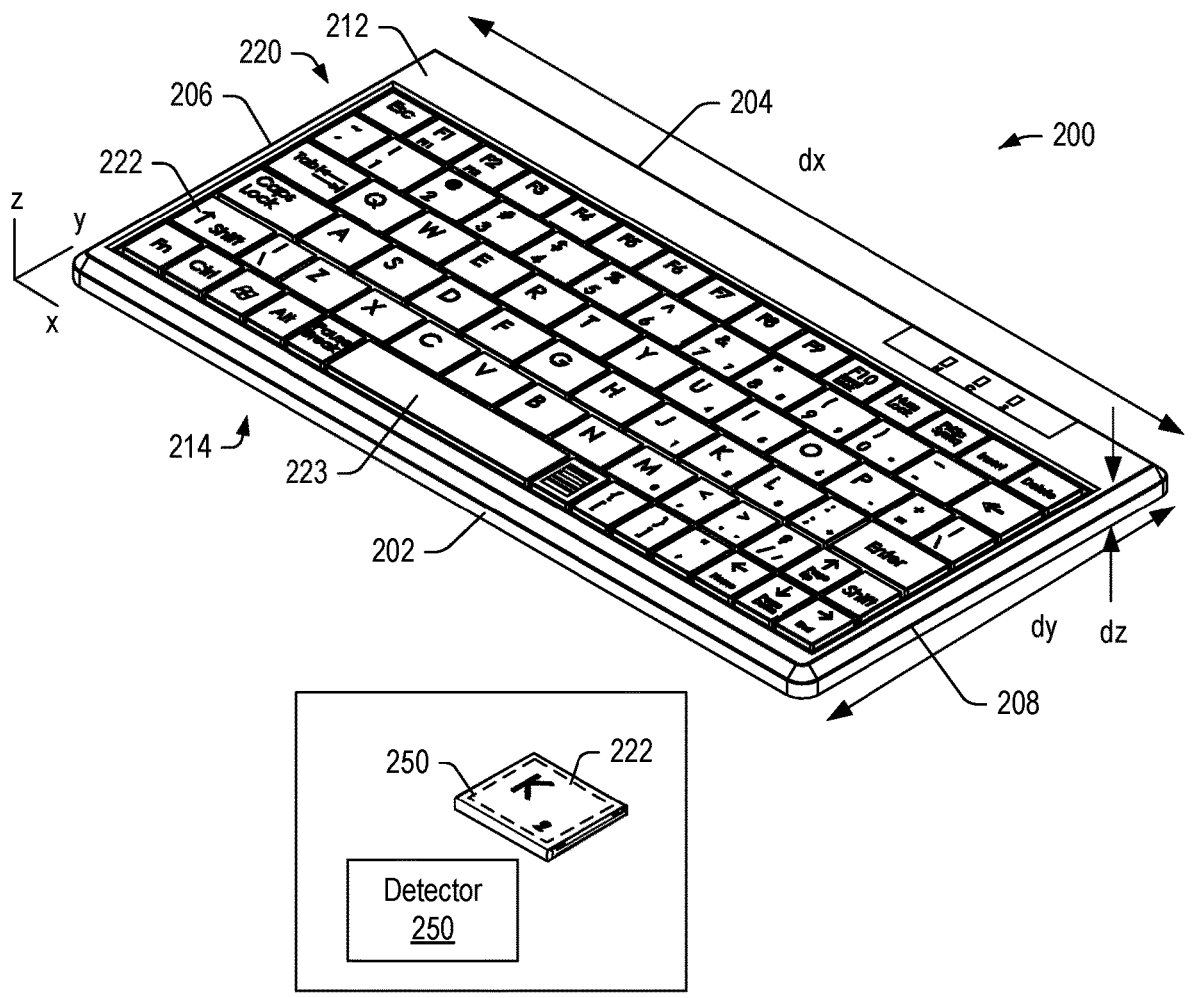
FIG. 2 is a diagram of an example of keyboard assembly.

FIG. 2 shows an example of a keyboard assembly 200 that includes a front edge 202, a back edge 204, and opposing side edges 206 and 208, which collectively may define a footprint of the keyboard assembly 200. As shown, the keyboard assembly 200 includes a top side 212 and a bottom side 214 where a keyboard 220 with keys 222 is present on the top side 212. As shown, the keyboard assembly 200 has a widthwise dimension dx, a depthwise dimension dy and a thickness dimension dz, noting that these dimensions may vary spatially as defined by the edges 202, 204, 206, 208 and/or the sides 212 and 214. As shown, the dimensions dx and dy define a substantially rectangular shape of the keyboard assembly 200 that may provide for accommodation of the keyboard 220 with the keys 222 arranged in various rows. As an example, the keys 222 may be arranged according to a QWERTY and/or other configuration of keys.

In the example of FIG. 2, one of the keys 222, a "K" key is shown as including a detector 250. In such an example, the detector 250 can be a fingerprint detector, which, as explained, may include one or more types of components (e.g., a sensor, circuitry, etc.). As an example, the detector 250 may be suitable as a component of a fingerprint reader; noting that a fingerprint reader may include one or more detectors (e.g., one or more sensors). As mentioned, a keyboard and keys thereof may comport with a standard such as, for example, the aforementioned ANSI standard. As explained, while the ANSI standard specifies keys centered with 0.75 inch or 19 mm spacing, a keyboard may utilize one or more other spacings, additionally or alternatively. As mentioned, as an example, a touch surface of a key may be less than approximately 0.75 inches or 19 mm in one or more dimensions (see, e.g., $x_1$ and $y_1$ coordinates in FIG. 1). For example, consider a touch surface of a key that may be less than 19 mm by 19 mm in area; noting that one or more other keys (e.g., return, shift, etc.) may include one or more dimensions of a touch surface that may be 19 mm or more. As shown in the example of FIG. 2, key sizes may vary in terms of shape and dimensions. As an example, a detector of a character key may include a detection surface (e.g., a sensing surface) that may be less than 19 mm by 19 mm in area. As an example, a character key of a keyboard may be approximately 16 mm by 16 mm in area. As an example, a key may include one or more square corners, one or more rounded corners, one or more straight sides and/or one or more curved sides.

In the example of FIG. 2, each of at least some of the letter keys (e.g., character keys) may include its own detector. For example, consider a home row of keys that may include at least A, S, D, F, J, K, L, and; keys with detectors. In such an example, the detectors may generate signals for a finger recognition framework, which may be part of the keyboard assembly 200 and/or operatively coupled to the keyboard assembly 200 (e.g., via wired circuitry and/or wireless circuitry).

Figure 3:
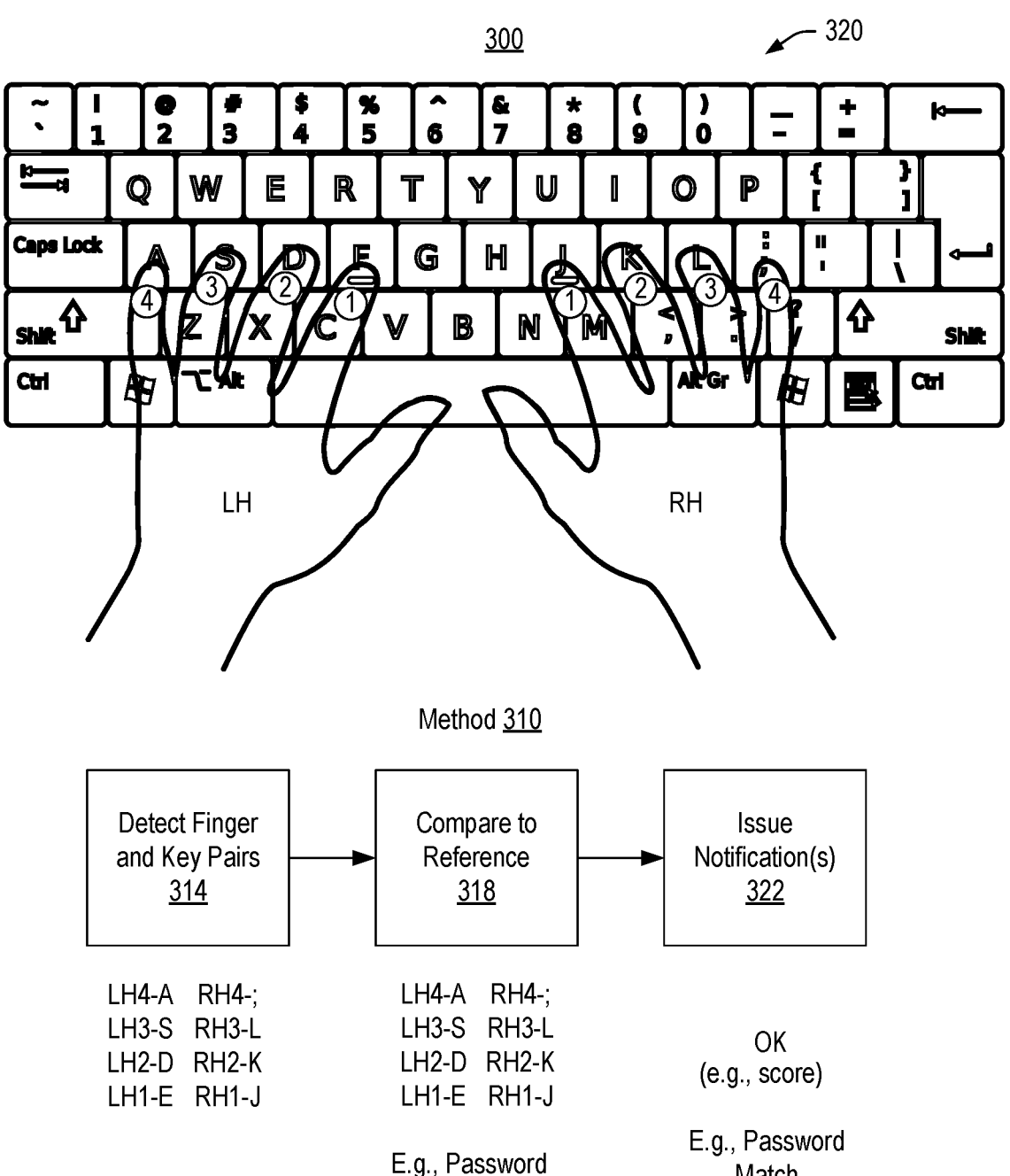
FIG. 3 is a diagram of an example of a keyboard and an example of a method.

FIG. 3 shows an example of a device 300 that includes a keyboard 320 where fingers of a left hand and fingers of a right hand are positioned along individual keys of a home row of keys. In such an example, the fingers may be number, for example, as LH1, LH2, LH3, LH4, RH1, RH2, RH3, and RH4. FIG. 3 also shows an example of a method 310 that includes a detection block for detecting finger and key pairs, a comparison block 318 for performing a comparison of one or more detected finger and key pairs to a reference, and an issuance block 322 for issuing one or more notifications based at least in part on the comparison. In the example of FIG. 3, if the reference pertains to touch-typing using a home row as shown, then the issuance block 322 may issue feedback such as "OK" and/or a score (e.g., 100). In the example of FIG. 3, if the reference is for a password, then the issuance block 322 may indicate a password match. As explained, a finger recognition framework may integrate finger recognition as associated with one or more surfaces or regions of a device and security. For example, in FIG. 3, a finger recognition framework may require that a particular individual aligns proper fingers with keys of a home row as a type of a password that upon authentication (e.g., detection and comparison) allow the individual to use the keyboard 320 of the device 300 (e.g., a computer, a keyboard assembly, etc.).

Figure 4:
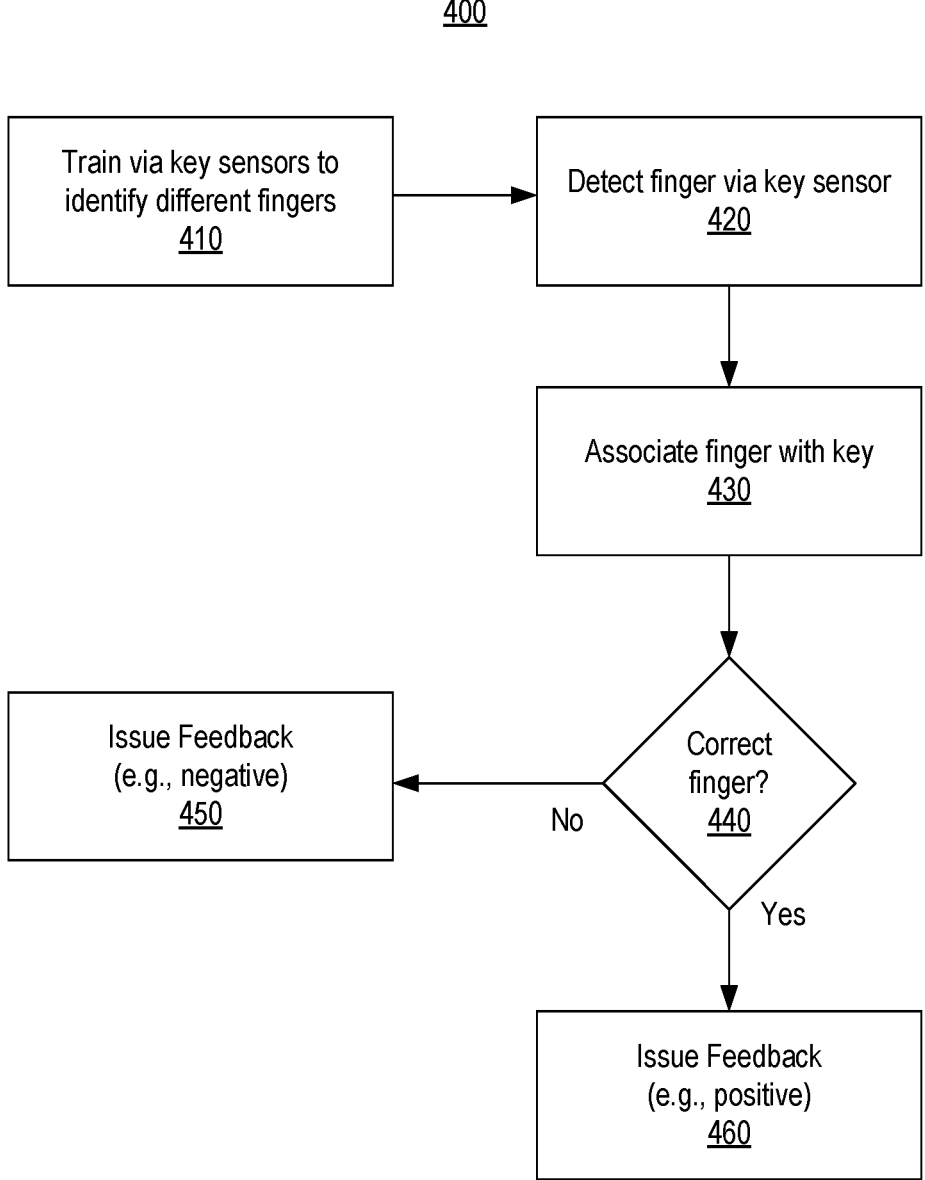
FIG. 4 is a diagram of an example of a method.

FIG. 4 shows an example of a method 400 that may be implemented by a finger recognition framework. As shown, the method 400 can include a train block 410 for training where such training is via key sensors (e.g., detectors) to identify different fingers, a detection block 420 for detecting a finger via a key sensor of a key, an association block 430 for associating the finger with the key, a decision block 440 for deciding whether the finger is the correct finger for the key, an issuance block 450 for issuing feedback responsive to the finger being the incorrect finger for the key (see, e.g., "no" branch of the decision block 440) and an issuance block 460 for issuing feedback responsive to the finger being the correct finger for the key (see, e.g., "yes" branch of the decision block 440).

As an example, training may be performed using one or more detectors. For example, consider the fingerprint reader 150 of FIG. 1, which may be a higher fidelity detector than, for example, the detector 250 of FIG. 2. In such an example, a base case for each finger of the left hand and each finger of the right hand of an individual may be established using a detector having a higher fidelity than a detector of a key. In such an example, the base case may provide for a relatively complete reading of a fingerprint; whereas, a detector of a key may provide for a reading of a portion thereof, which may be due to fingertip size, key size, key detector size, force applied to a key, angle of a fingertip with respect to a key, etc.

Figure 5:
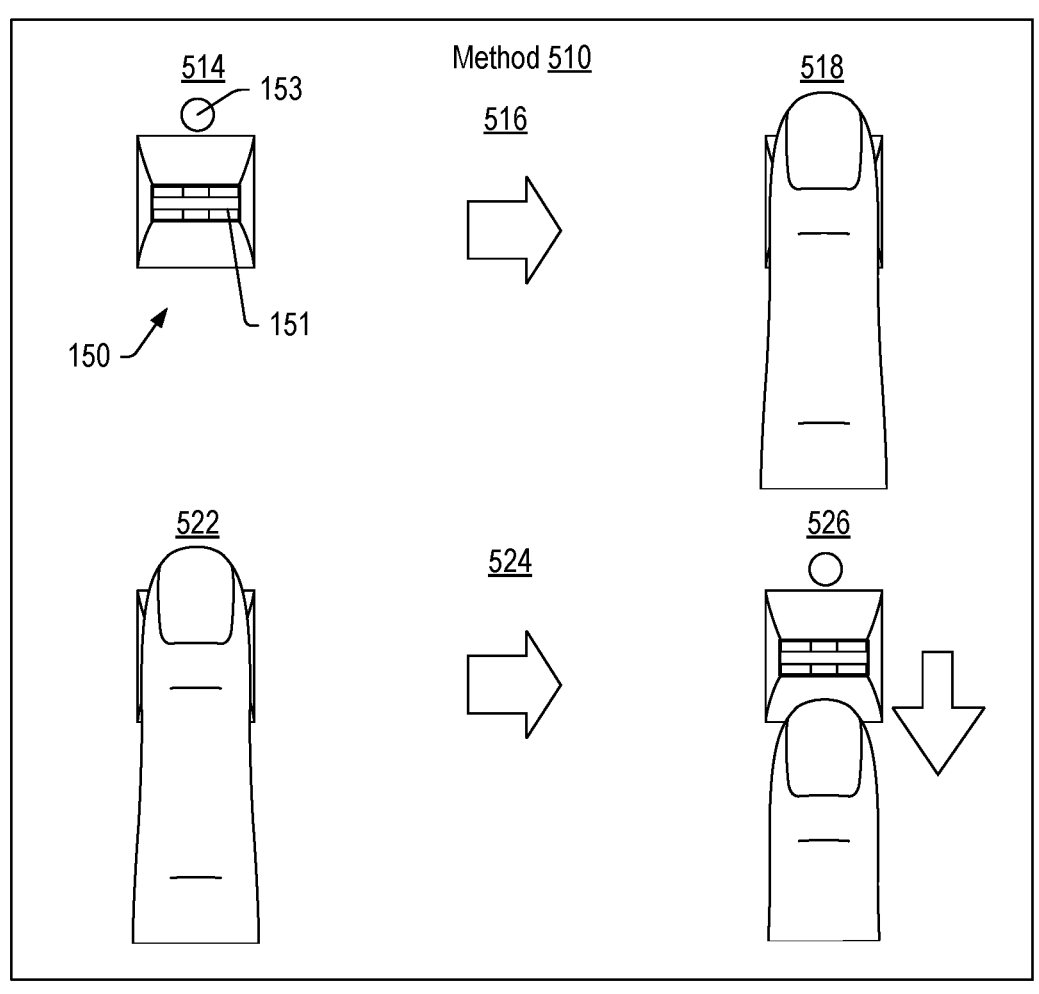
FIG. 5 is a diagram of an example of a method and examples of fingerprints.
Figure 5:
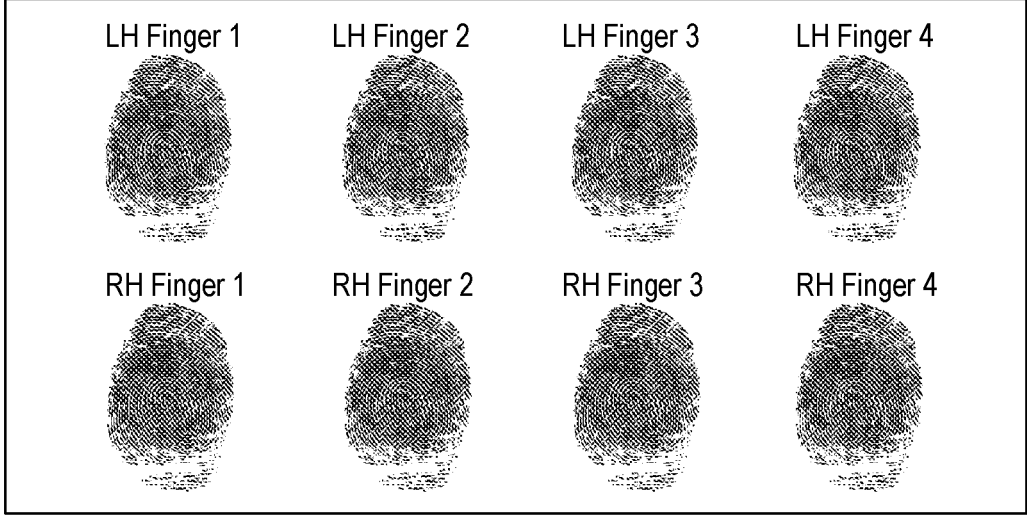

FIG. 5 shows an example of a method 510 that may be implemented with respect to a detector such as, for example, the fingerprint reader 150, which may include a detection component 151 (e.g., a window) and a sensor component 153. In such an example, the sensor component 153 may be a light detector and/or another type of detector that can determine whether a finger is properly positioned with respect to the detection component 151 (e.g., a reader component). As shown in the example of FIG. 5, fingerprint data may be acquired for various left hand and various right hand fingers, where at least a portion of such fingerprint data may be stored to a database in raw and/or processed form, which may be a compressed form.

In the example of FIG. 5, the method 510 includes a provision block 514 for providing the fingerprint reader 150, a reception block 516 for receiving a finger by the fingerprint reader 150, and a positioning block 518 for positioning the finger with respect to the fingerprint reader 150. Upon positioning, the fingerprint reader 150 may become active for acquiring information (e.g., for detecting a fingerprint, generating fingerprint data, sensing a fingerprint, etc.). As shown in FIG. 5, the method 510 includes an active block 522 for activating the fingerprint reader 150, a data acquisition block 524 for acquiring fingerprint data via the fingerprint reader 150, and a termination block 526 for terminating acquisition of fingerprint data via the fingerprint reader 150. As shown, the termination block 526 may be triggered by an absence of a finger with respect to the fingerprint reader 150.

In the example of FIG. 5, the fingerprint reader 150 is shown as including the detection component 151 as well as the sensor component 153, which may sense the presence of a finger with respect to the fingerprint detection component 151, etc. As an example, the sensor component 153 may be a proximity sensor that can sense a finger being placed proximate to the sensor component 153, which may indicate that the finger is likely aligned with respect to the detection component 151 for purposes of having a fingerprint of the finger read by the fingerprint reader 150.

In the example of FIG. 5, the fingerprint reader 150 may be a line reader in that the fingerprint reader 150 acquires fingerprint information in sections or segments as a finger is translated across the detection component 151 (e.g., a detection window). As to a detector of a key (see, e.g., the detector 250 of FIG. 2), it may be an area reader in that it may read more than a line at a time. As an example, a device may include one or more types of components for fingerprint detection. For example, consider a device that includes a fingerprint reader and one or more detectors for fingerprint detection where, for example, the fingerprint reader may be a line reader and the one or more detectors may be area readers (e.g., reading more than a line at a single instant in time).

As an example, a computing device may include circuitry for enrolling a fingerprint. For example, where a device is operatively coupled to more than one fingerprint reader, an option may exist to select a particular fingerprint reader. For enrollment, a user can swipe a finger over a fingerprint reader where, for example, a progress bar may be rendered to a display of a computing device to indicate progress of reading.

As an example, a computing device may include an option to enroll more than one finger. For example, as explained, in the example of FIG. 5, the fingerprint reader 150 may provide for reading left hand fingerprints of left hand fingers and right hand fingerprints of right hand fingers. While the fingerprint reader 150 is shown as being a single finger at a time reader, as an example, a fingerprint reader may provide for reading multiple fingerprints at one time (e.g., simultaneously). For example, consider a surface that is sufficiently large in area for placement of fingertips of a left hand and/or a right hand to thereby acquire data for multiple fingers simultaneously.

As an example, a computing device may include associating a password (e.g., a PIN code, etc.) with a fingerprint or fingerprints. As an example, a fingerprint may be enrolled for performing a power-on operation of a computing device and/or for access to one or more drive passwords (e.g., BIOS passwords, etc.).

As an example, a fingerprint reader may be setup in BIOS. For example, consider setting a power-on password or a drive password for a computing device (e.g., or both), turning off the computing device and then turning it on. In such an example, a prompt may be rendered to a display for a user to swipe a finger with respect to a fingerprint reader. Next, a prompt may be rendered for entry of the power-on password, drive password, or both as requested. In such an example, the enrolled fingerprint is then associated with the power-on password, the drive password, or both. In such an example, a user may log on to the computing device by swiping her finger with respect to the fingerprint reader. In the foregoing example, if the password is lost and the finger not authenticatable (e.g., for one or more reasons), the computing device may be unable to boot in a manner where the password can be changed.

A BIOS Setup Utility program of a computing device may offer one or more choices such as, for example, pre-desktop authentication (e.g., enables or disables the fingerprint authentication before the operating system is installed); reader priority (e.g., external or internal fingerprint sensor as the priority); and security mode (e.g., specify settings of the security mode).

As an example, a base case may be stored as an array such as a pixel array and/or in another form. For example, a fingerprint may be vectorized and/or otherwise broken down into components, equations, etc.

As an example, a method can include accounting for read variability and analyzing, which may be performed according to one or more classification systems. As an example, such a method may be performed at least in part via circuitry of a fingerprint reader and optionally at least in part via circuitry of a biometric framework.

In the Henry system of classification, there are three basic fingerprint patterns: loop, whorl, and arch, which tend to make up about 60% to about 65%, about 30% to about 35%, and about 5% of most fingerprints, respectively. There are also more complex classification systems that break down patterns even further, for example, into plain arches or tented arches, and into loops that may be radial or ulnar, depending on the side of the hand toward which the tail points. Ulnar loops start on the pinky-side of the finger, the side closer to the ulna, the lower arm bone. Radial loops start on the thumb-side of the finger, the side closer to the radius. Whorls may also have sub-group classifications including plain whorls, accidental whorls, double loop whorls, peacock's eye, composite, and central pocket loop whorls.

As an example, data may be processed as to one or more signatures of errors and/or changes. Such an approach may utilize one or more signatures to expand the scope of what is acceptable for authentication. As an example, a standard deviation of a region (e.g., an area) of a fingerprint may be increased as to what is acceptable for that region in terms of authentication (e.g., while another region or regions differ in standard deviation).

As an example, fingerprint-based recognition may be described in terms of a test of statistical hypotheses. For example, consider a query dataset corresponding to an "unknown" identity being acquired where an analysis may aim to determine if the query dataset belongs to an individual. Such an approach can include accessing a base case dataset (e.g., a template, data point cloud, etc.) and performing one or more comparisons (e.g., matching) as part of an analysis to test a hypothesis or hypotheses (e.g., belongs to individual or does not belong to individual). An analysis may aim to determine a degree of similarity, which can be based on matching of minutiae (e.g., minutiae pairs, etc.).

FIG. 6 shows an example of a biometric framework architecture 600 that includes various features or components, including, for example, an application programming interface (API) 610, a service 620, a service provider 630, and a driver interface 650. As shown, the service provider 630 can include a sensor adapter 632, an engine adapter 634 and a storage adapter 636. As shown, the driver interface 650 can include a user-mode driver framework (UMDF) driver 652, a kernel-mode driver framework (KMDF) driver 654 and/or a WINDOWS driver model (WDM) driver. A biometric framework may include one or more of the features or components that can operatively couple to a fingerprint reader or fingerprint readers.

The sensor adapter 632 can perform sample-capture operations (e.g., live scan fingerprint reader data acquisition). The engine adapter 634 can perform processing including, for example, one or more of data normalization, feature extraction, and biometric template generation. As an example, the engine adapter 634 may match biometric data to template(s) during enrollment, identification, and/or verification operations. The storage adapter 636 can store, manage, and retrieve one or more template.

As an example, circuitry and/or associated functions of one or more of the adapters 632, 634 and 636 may be native to a fingerprint reader. As an example, in an operating system (OS) environment, one or more adapter components may be provided as follows: for fingerprint readers that lack on-chip storage or matching capabilities, the service provider 630 may provide inbox reader and storage adapters components (e.g., or an independent hardware vendor (IHV) or independent software vendor (ISV) is to supply an engine adapter component); and, for fingerprint readers that do support on-chip matching and storage, an IHV or an ISV is to supply adapter components.

As an example, one or more features of the biometric framework architecture 600 of FIG. 6 may be operatively coupled to one or more features of a framework for one or more human input devices such as, for example, a keyboard that includes keys where at least one of the keys includes a detector for fingerprint detection. In such an example, coordinated action between the two frameworks may occur, optionally by transmission of signals to a processor and/or other circuitry of a device. In such an example, one or more decisions may be made on the basis of signals from one or more frameworks. For example, consider circuitry that can make decisions using signals from a keyboard framework and a biometric framework where such decisions may provide for learning, proper usage, security, etc., of a device.

As an example, an application may extend a biometric framework by providing one or more management capabilities and/or enabling one or more additional scenarios, including enrollment experiences, Web single-sign-on, management of proprietary attributes of a fingerprint reader, learning, proper usage (e.g., touch-typing, etc.), security (e.g., login, access to one or more resources), etc.

Figure 7:
FIG. 7 is a diagram of an example of a scenario.
Figure 7:
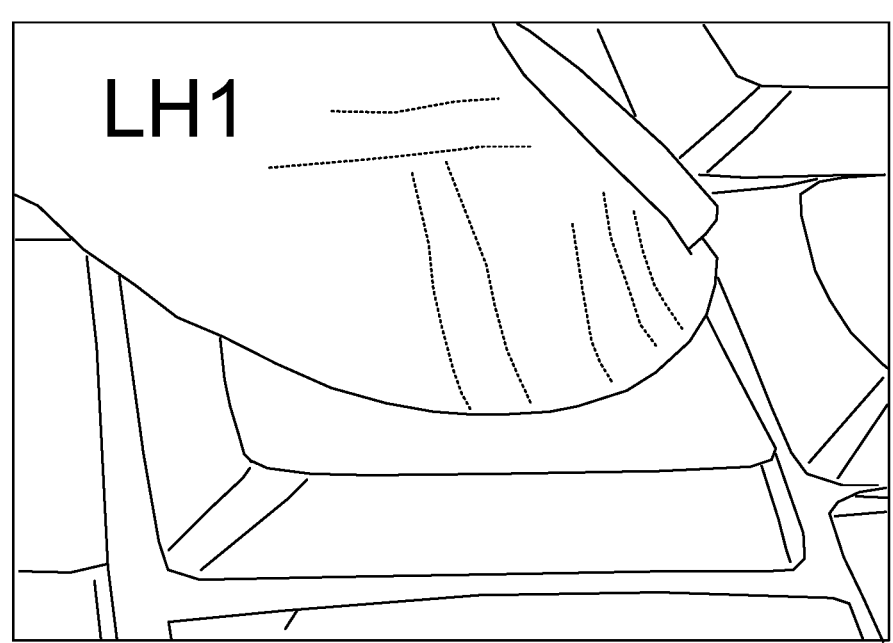
Figure 7:
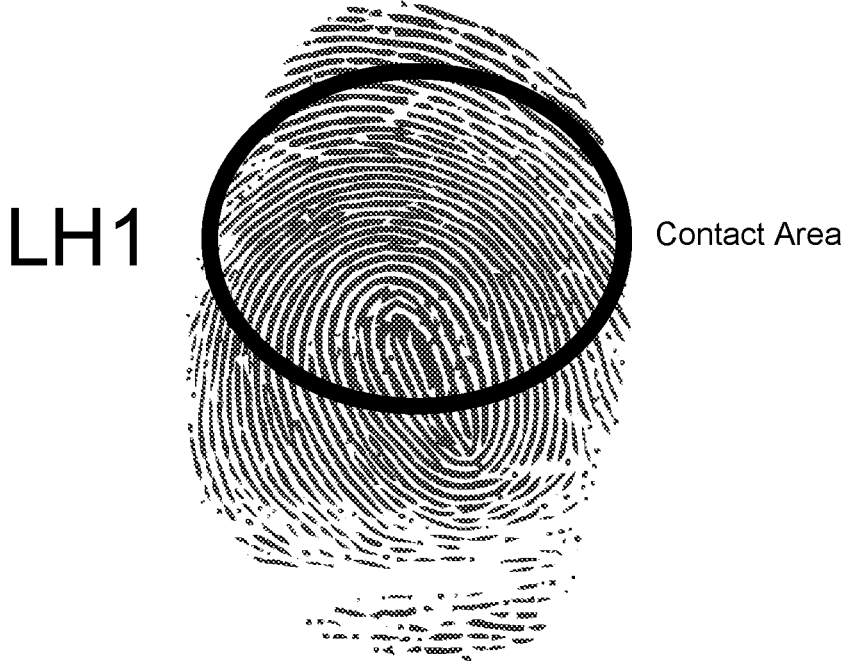

FIG. 7 shows an example of a scenario 700 where an index finger of the left hand of an individual is in contact with a key of a keyboard (e.g., a touch surface of a key of a keyboard). As shown, a contact area may be less than an area of an entire fingerprint. For example, the fingerprint reader 150 may provide for reading a larger area than the detector 250; noting that the fingerprint reader 150 may be a line reader that demands finger translation with respect to a line sensor to read a larger area and that the detector 250 may be an area reader that can read an area of a fingertip without requiring finger translation (e.g., via a simultaneous detection over an area and/or a circuitry-based scanning detection over an area). As an example, a detector of a key (e.g., or trigger or other device surface) may be configured to detect a fingerprint in a relatively short period of time (e.g., less than 500 ms); whereas, a line reader type of fingerprint reader may demand more time (e.g., consider a finger translation time of 500 ms or more), which may be for increased accuracy in reading, etc. (e.g., too fast of a finger translation time may confound one or more types of line reader fingerprint readers).

As an example, in various instances of keyboard fingertip and key contacts, there may be some amount of variation in contact area between a fingertip and a key. For example, in touch-typing, the left index finger may be positioned on the F key in a home row where if the left index finger reaches upwardly to touch a different key (e.g., in a higher row), it may contact that key with a contact area that differs from a situation where the left index finger reaches downward to touch a different key (e.g., in a lower row). As such, a detector of one key may not see the same fingertip area of a finger as a detector of another key. Thus, as to a base case, it may be established for an area of a fingertip that is sufficiently large to accommodate the areas detectable by various keys that may be likely to be associated with that fingertip (e.g., as may be constrained by a particular touch-typing standard). In various touch-typing standards the range of a finger may be limited to a region about a home key in a home row assigned to that finger. Hence, the angles of contact and contact areas may be relatively generalizable.

As an example, a finger recognition framework may include a base case for each finger that may be utilized to pair a key with a finger where, depending, on the location of the key, the amount of base case data actually utilized to recognize a finger may be less than a total amount of base case data and, as explained, may differ from key to key for that finger.

Figure 8:
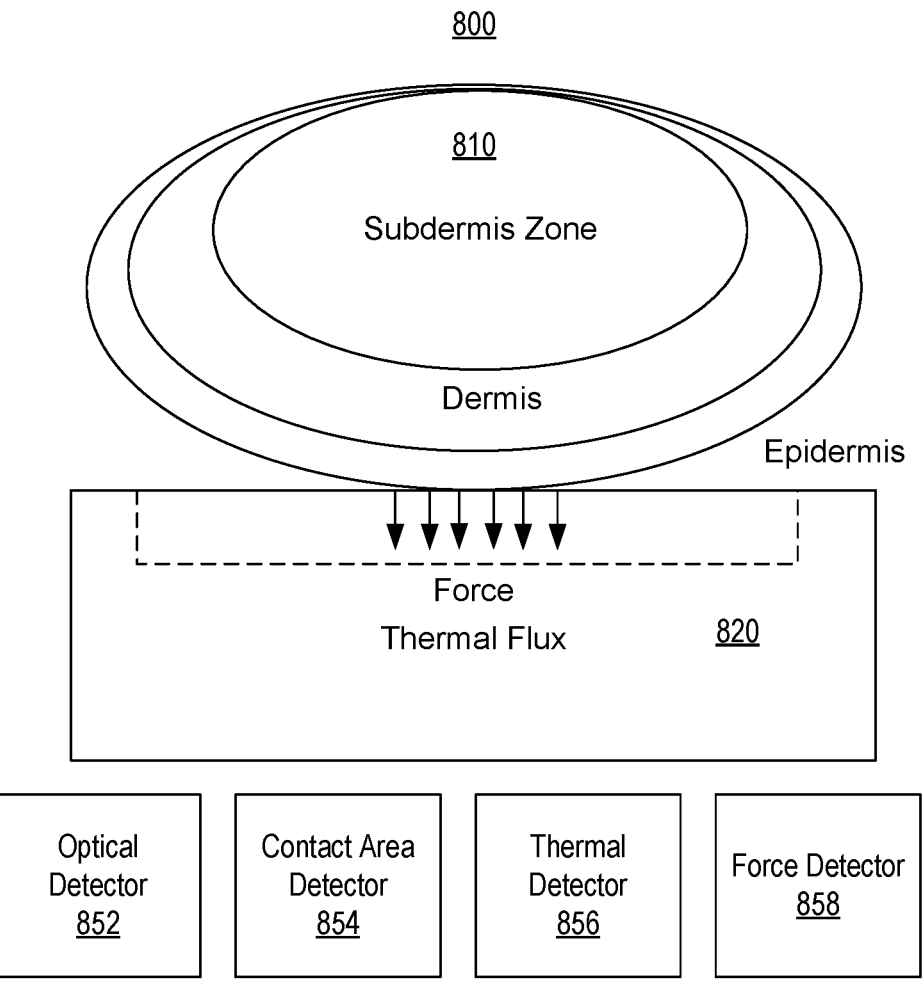
FIG. 8 is a diagram of an example of a scenario.

FIG. 8 shows an example of a scenario 800 where a finger 810 contacts a portion of a device 820 where the finger 810 may include a subdermis zone, a dermis, and an epidermis where the epidermis physically contacts the portion of the device 820. In such an example, detection may be via one or more of an optical detector 852, a contact area detector 854, a thermal detector 856, and/or a force detector 858. As an example, a combination of physical phenomena may be combined for determining what finger is in contact with a region of a device.

As an example, one or more types of circuitry may be utilized to improve determinations, for example, with respect to accuracy and/or with respect to speed. As an example, a differential approach may be implemented for making one or more determinations. For example, consider a process of exclusion that may utilize information about fingers that extend from a hand and/or detector-based determinations as to multiple fingers. In such an example, it may be unlikely that a little finger of the right hand is positioned leftward of an index finger of the right hand. In such an example, if the index finger is determined to be in contact or recent contact with one key such as, for example, the J key and a contact is detected for the P key, then determination process may exclude or otherwise reduce the probability that the index finger is in contact with the P key. In such an example, the detected contact with the P key may be narrowed down to one of three fingers rather than one of four fingers, which may increase detection time and/or accuracy of properly determining that the little finger of the right hand is in contact with or contacted the P key. As an example, one or more physics-based models and/or empirical models may be utilized, which may consider physical movements such as hand and/or finger speed. Such an approach may make determinations as to last known position of a finger (e.g., key contact for a finger) and whether a current position may possibly be for the same finger (e.g., can a finger possibly move from one position to another in a given amount of time). As an example, a device may include circuitry that provides timestamps for finger contacts where such timestamps may be temporal information that may be utilized in one or more determinations as fingers and contact surfaces. For example, consider a device that demands that a user contact one surface before another surface before enabling the device. In such an example, a safety protocol may demand that a guard is contacted with a proper finger as a safety check before a trigger is enabled via contacting the trigger with a proper finger, where the safety protocol may specify that the fingers are the same, different fingers of the same hand, fingers of different hands, etc. As an example, for a device that demands two-handed action, multiple determinations may be performed before enabling one or more features of the device; noting that such determinations may occur during use whereby a determination of non-contact by one or more fingers may act to disable the device (e.g., consider a two-handed weapon, a two-handed power tool, a two-handed steering wheel, etc.).

Figure 9:
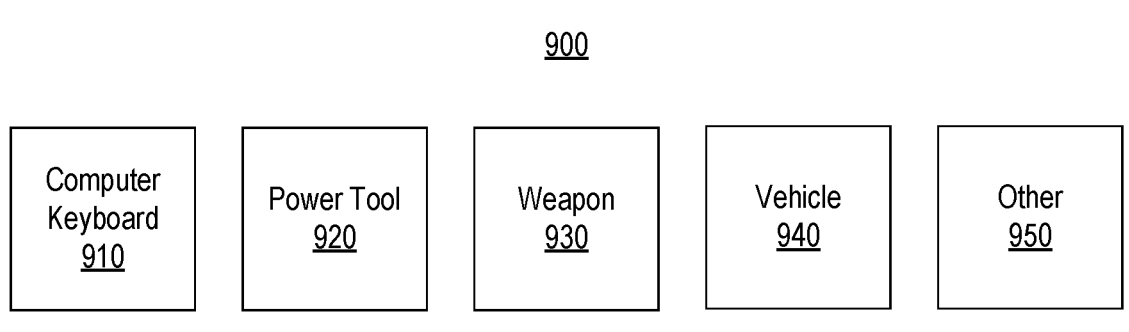
FIG. 9 is a diagram of examples of devices and an example of a method.
Figure 9:
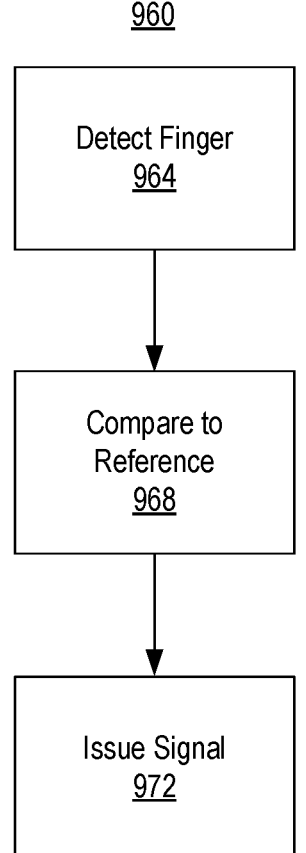

FIG. 9 shows examples devices 910, 920, 930, 940 and 950 that may include one or more finger recognition frameworks and/or be operatively coupled to one or more finger recognition frameworks. As shown the device 910 may be a computer keyboard, the device 920 may be a power tool, the device 930 may be a weapon, the device 940 may be a vehicle, and the device 950 may be one or more other devices.

As an example, one or more of the devices 910, 920, 930, 940 and 950 may provide for implementation of a method such as, for example, a method 960. As shown in the example of FIG. 9, the method 960 includes a detection block 964 for detecting a finger, a comparison block 968 for performing a comparison of a detected finger to a reference, and an issuance block 972 for issuing a signal responsive to the comparison. As explained, a detected finger may be associated with a particular region of a device where, for example, a reference may include one or more associations between a finger and a region or regions. In such an example, as mentioned, temporal information may be utilized, for example, to improve accuracy, reduce time, etc. As an example, temporal information may be utilized for one or more purposes, which may include purposes such as touch-typing training (e.g., typing speed, etc.), security (e.g., time to enter a code, time to reset, etc.), setting a timer, expiring a timer, etc. As to one or more timers, as an example, a device may be operable or not operable, in part and/or in whole, according to one or more timers that may depend on one or more finger-contact surface determinations.

Figure 10:
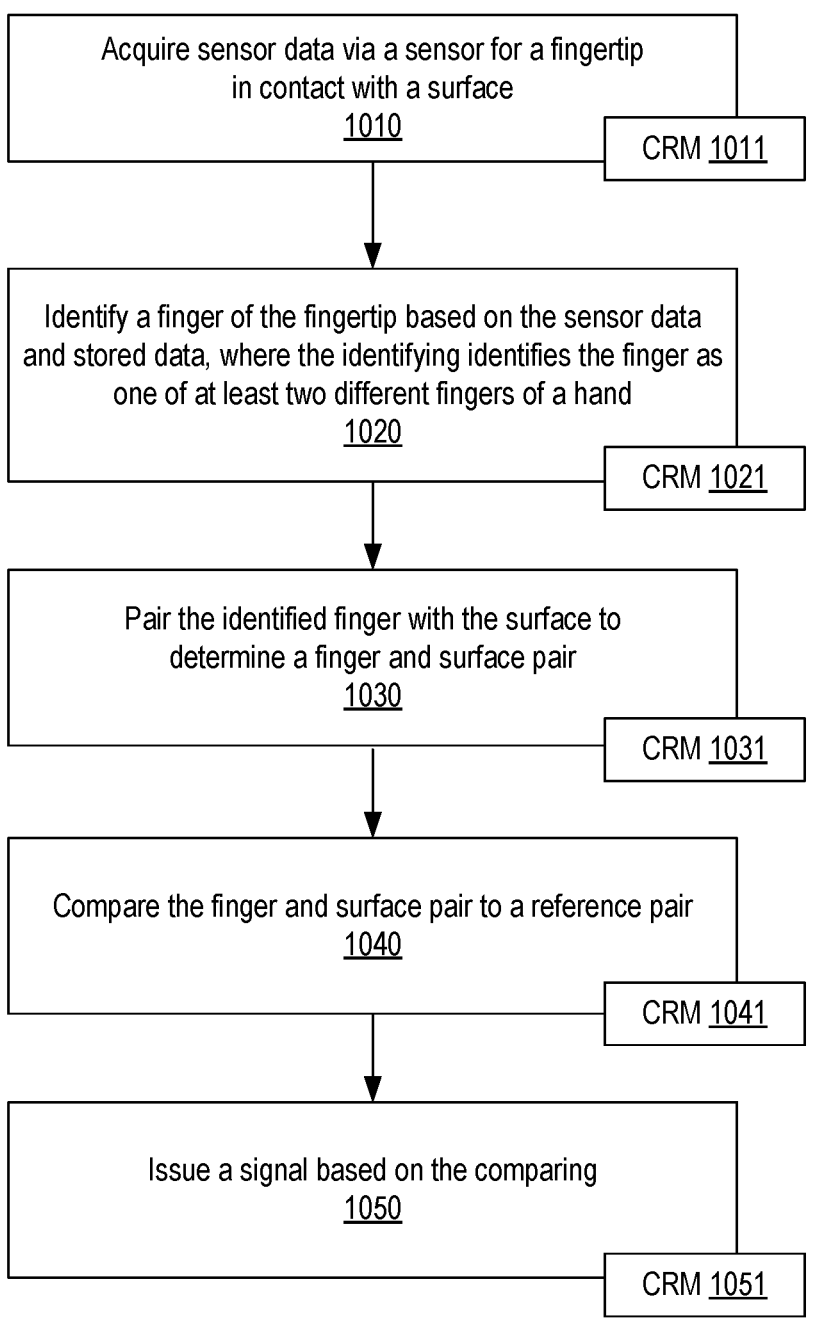
FIG. 10 is a diagram of an example of a method.

FIG. 10 shows an example of a method 1000 that can include an acquisition block 1010 for acquiring sensor data via a sensor for a fingertip in contact with a surface; an identification block 1020 for identifying a finger of the fingertip based on the sensor data and stored data, where the identifying identifies the finger as one of at least two different fingers of a hand; a pairing block 1030 for pairing the identified finger with the surface to determine a finger and surface pair; a comparison block 1040 for comparing the finger and surface pair to a reference pair; and an issuance block 1050 for, based on the comparing, issuing a signal.

In the example of FIG. 10, various computer-readable media (CRM) blocks 1011, 1021, 1031, 1041, and 1051 are shown, which may include processor-executable instructions stored therein. As an example, one or more of the blocks 1011, 1021, 1031, 1041, and 1051 may be a single CRM or multiple CRMs.

Figure 11:
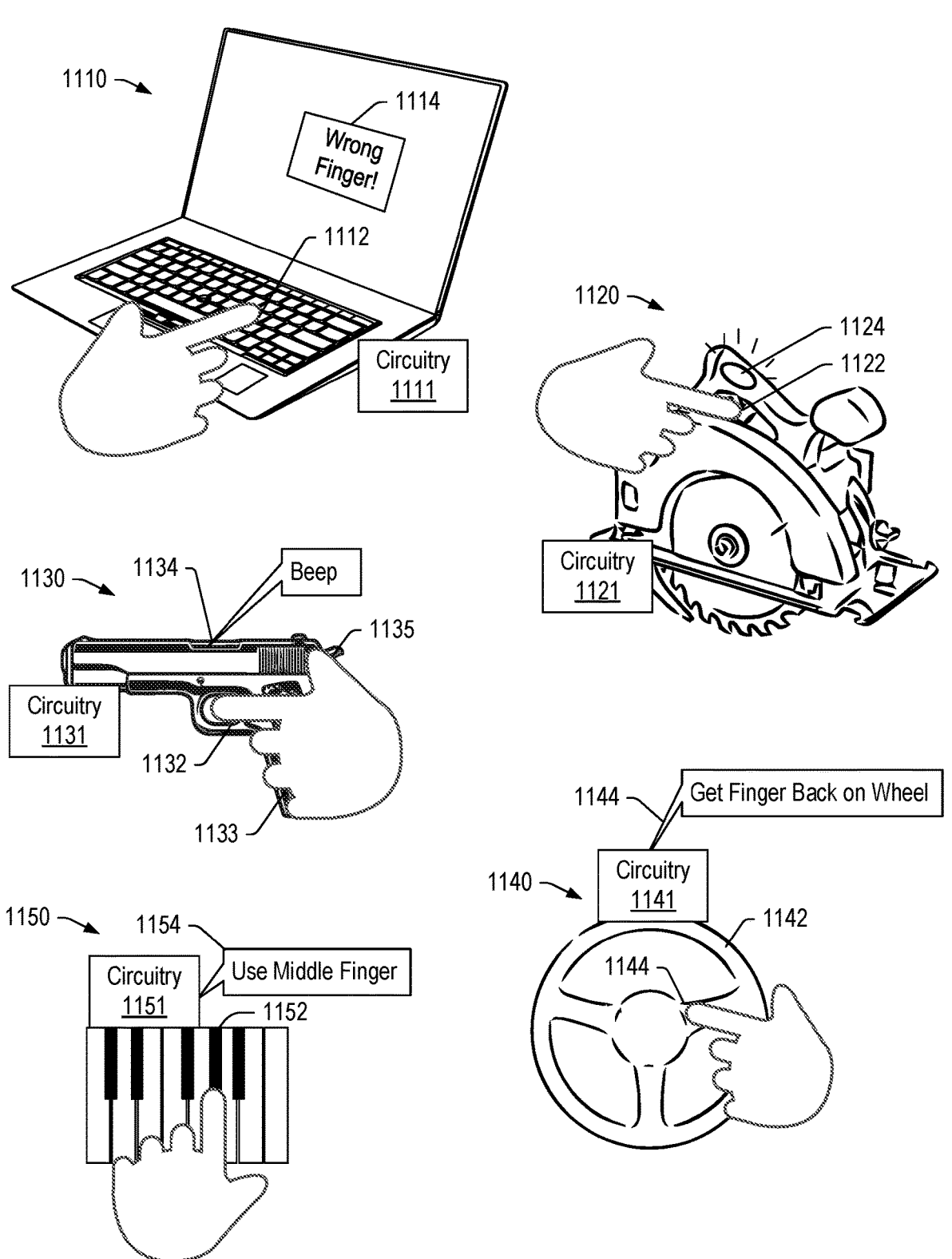
FIG. 11 is a diagram of example scenarios.

FIG. 11 shows example scenarios 1110, 1120, 1130, 1140, and 1150 where the scenario 1110 involves using circuitry 1111 for issuing a signal 1114 to indicate that an incorrect finger is on a key 1112 of a keyboard of a computing device, the scenario 1120 involves using circuitry 1121 for issuing a signal 1124 to indicate that a correct finger is on a trigger 1122 of a power tool, the scenario 1130 involves using circuitry 1131 for issuing a signal 1134 to indicate that a correct finger is on a trigger 1132 of a weapon, the scenario 1140 involves using circuitry 1141 for issuing a signal 1144 to indicate that a finger of a hand is not on a steering wheel 1142 of a vehicle but, for example, elsewhere on another surface 1144 of the steering wheel 1142, and the scenario 1150 involves using circuitry 1151 for issuing a signal 1154 to indicate that another finger of a hand should be utilized to touch a key 1152 of a musical instrument as a type of device (e.g., a keyboard instrument, an instrument with keys, etc.). As example, a device can include a finger recognition framework and/or be operatively coupled to a finger recognition framework. For example, the circuitry 1111, 1121, 1131, 1141 and/or 1151 can include a finger recognition framework. As an example, a signal may be one or more of visual, haptic, audial, etc. For example, the signal 1114, the signal 1124, the signal 1134, the signal 1144 and/or the signal 1154 may be one or more of visual, haptic, and audial. As an example, a signal may be issued that may disable or enable one or more features of a device. For example, consider enabling a trigger of a power tool upon proper placement of one or more fingers on the power tool. In the example scenario 1120, one finger may be required on a trigger and another finger may be required on a blade cover (e.g., a blade guard or lever for moving a blade guard) and/or on a safety switch. In the example scenario 1130, the weapon may include various surfaces such as a grip surface 1133 and/or a latch surface 1135, which may provide for finger recognition of one or more fingers.

As an example, a finger recognition framework may issue one or more types of signals, which may depend on one or more recognized fingers and optionally placement thereof. In such an example, one type of signal may indicate a problem and another type of signal may indicate no problem. As an example, a signal that may indicate a problem may provide for issuance of one or more corrective measures, prohibitions, etc.

As an example, a method can include acquiring sensor data via a sensor for a fingertip in contact with a surface; identifying a finger of the fingertip based on the sensor data and stored data, where the identifying identifies the finger as one of at least two different fingers of a hand; pairing the identified finger with the surface to determine a finger and surface pair; comparing the finger and surface pair to a reference pair; and, based on the comparing, issuing a signal. In such an example, the signal may be a match signal for a match between the finger and surface pair and the reference pair or a non-match signal for a non-match between the finger and surface pair and the reference pair.

As an example, a surface may be a surface of a key of a keyboard. In such an example, a method can include comparing that fails to match the finger and surface pair to the reference pair, such that a signal may indicate improper touch-typing; whereas, for example, if such comparing matches the finger and surface pair to the reference pair, the signal may indicate proper touch-typing.

As an example, a method can include comparing that fails to match a finger and surface pair to a reference pair, where a signal may indicate a failure to authenticate to a passcode; whereas, for example, if such comparing matches the finger and surface pair to the reference pair, the signal may indicate authentication of a passcode.

As an example, a surface may be a surface of a power tool. As an example, a surface may be a surface of a weapon where, for example, the weapon may be a gun. In such an example, the surface may be a trigger surface or another surface. As an example, a surface may be a surface of a musical instrument (e.g., a key or another surface, etc.).

As an example, a sensor may be a fingerprint sensor. As an example, a sensor may be a detector. As an example, a detector may include a sensor or sensors.

As an example, a sensor may be or include an optical sensor. As an example, a sensor may be or include a thermal sensor.

As an example, at least two different fingers may include at least an index finger and a middle finger. As an example, at least two different fingers may include at least an index finger, a middle finger, and a ring finger.

As an example, a hand may be a left hand or a right hand. As an example, a method may include identifying a finger where such identifying identifies the finger as a left hand finger or a right hand finger.

As an example, a device can include a processor; memory accessible to the processor; a sensor that acquires sensor data for a fingertip in contact with a surface; processor-executable instructions stored in the memory and executable by the processor to instruct the device to: identify a finger of the fingertip based on the sensor data and stored data, where an identification identifies the finger as one of at least two different fingers of a hand; pair the identified finger with the surface to determine a finger and surface pair; perform a comparison of the finger and surface pair to a reference pair; and issue a signal based on the comparison. In such an example, the device may include a keyboard, where the surface is or includes a surface of a key of the keyboard. As an example, a device may include a trigger, where a surface is or includes a surface of the trigger.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
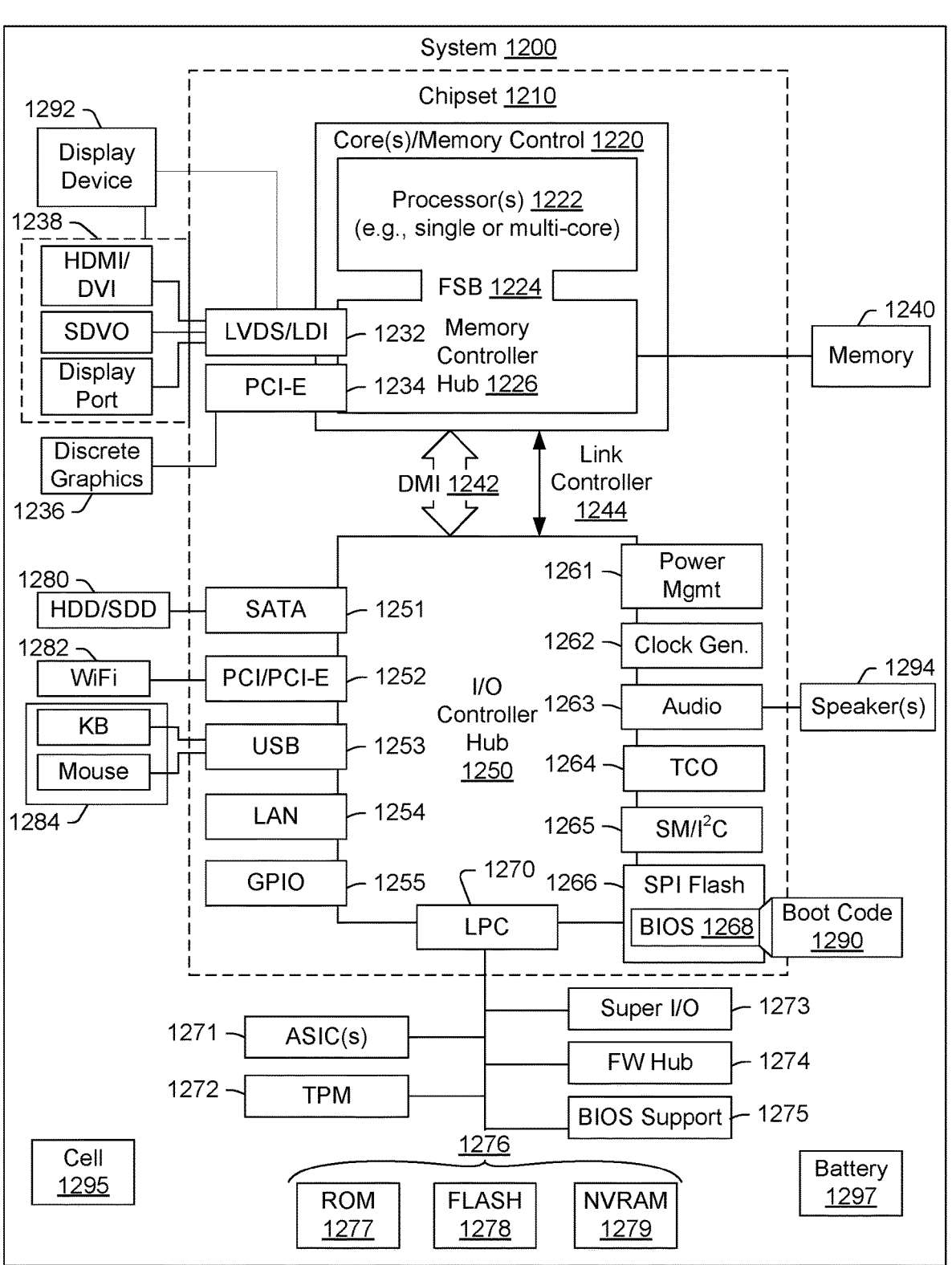
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a satellite, a base, a server or other machine may include other features or only some of the features of the system 1200. As an example, one or more of the devices 910, 920, 930, 940 and/or 950 can include one or more features of the system 1200 of FIG. 12.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG.

12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
acquiring sensor data via a sensor for a fingertip in contact with a surface;
identifying a finger of the fingertip based on the sensor data and stored data, wherein the identifying identifies the finger as one of at least two different fingers of a hand;
pairing the identified finger with the surface to determine a finger and surface pair;
comparing the finger and surface pair to a reference pair; and
based on the comparing, issuing a signal, wherein the surface comprises a surface of a key of a keyboard and wherein the comparing fails to match the finger and surface pair to the reference pair, the signal indicates improper touch-typing.
2. The method of claim 1, wherein the signal comprises a match signal for a match between the finger and surface pair and the reference pair or a non-match signal for a non-match between the finger and surface pair and the reference pair.
3. The method of claim 1, wherein the comparing matches the finger and surface pair to the reference pair, the signal indicates proper touch-typing.
4. The method of claim 1, wherein the sensor comprises a fingerprint sensor.
5. The method of claim 1, wherein the sensor comprises an optical sensor.
6. The method of claim 1, wherein the sensor comprises a thermal sensor.
7. The method of claim 1, the at least two different fingers comprise at least an index finger and a middle finger.
8. The method of claim 1, the at least two different fingers comprise at least an index finger, a middle finger, and a ring finger.
9. The method of claim 1, wherein the hand comprises a left hand or a right hand.
10. The method of claim 1, wherein the identifying the finger comprises identifying the finger as a left hand finger or a right hand finger.
11. The method of claim 1, comprising, responsive to the signal, issuing touch-typing training feedback for proper touch-typing according to a touch-typing standard.
12. The method of claim 1, comprising, responsive to the signal, issuing feedback responsive to the finger being the incorrect finger for the key.
13. The method of claim 1, wherein the signal corresponds to a temporal information indicative of touch-typing typing speed.
14. A device comprising:
a processor;
memory accessible to the processor;
a sensor that acquires sensor data for a fingertip in contact with a surface;
processor-executable instructions stored in the memory and executable by the processor to instruct the device to:
identify a finger of the fingertip based on the sensor data and stored data, wherein an identification identifies the finger as one of at least two different fingers of a hand;
pair the identified finger with the surface to determine a finger and surface pair;
perform a comparison of the finger and surface pair to a reference pair; and
issue a signal based on the comparison, wherein the surface comprises a surface of a key of a keyboard and wherein the comparison fails to match the finger and surface pair to the reference pair, the signal indicates improper touch-typing.

* * * * *